Sept. 22, 1931.  W. M. BAILEY  1,824,586

ELECTRICAL CONDENSER

Filed May 27, 1924   7 Sheets-Sheet 1

INVENTOR
William M. Bailey
BY
Philip Farnsworth
ATTORNEY

Sept. 22, 1931.  W. M. BAILEY  1,824,586
ELECTRICAL CONDENSER
Filed May 27, 1924    7 Sheets-Sheet 2

INVENTOR
William M. Bailey
BY
Philip Farnsworth
ATTORNEY

Sept. 22, 1931.    W. M. BAILEY    1,824,586
ELECTRICAL CONDENSER
Filed May 27, 1924    7 Sheets-Sheet 3

INVENTOR
William M. Bailey
BY
Philip Farnsworth
ATTORNEY

Sept. 22, 1931.     W. M. BAILEY     1,824,586
ELECTRICAL CONDENSER
Filed May 27, 1924      7 Sheets-Sheet 5

INVENTOR
William M. Bailey
BY
ATTORNEY

INVENTOR
William M. Bailey
BY Philip Famsworth
ATTORNEY

INVENTOR
William M. Bailey
BY Philip Farnsworth
ATTORNEY

Patented Sept. 22, 1931.

1,824,586

UNITED STATES PATENT OFFICE

WILLIAM M. BAILEY, OF LYNN, MASSACHUSETTS, ASSIGNOR TO WIRELESS SPECIALTY APPARATUS COMPANY, OF BOSTON, MASSACHUSETTS, A CORPORATION OF NEW YORK

ELECTRICAL CONDENSER

Application filed May 27, 1924. Serial No. 716,107.

This invention relates to improvements in electrical condensers, particularly of the type wherein sheets of dielectric and conducting foils are built up in a stack, the dielectric sheets being preferably at present of mica.

The invention relates more particularly to condensers designed to carry high currents of, say, ten amperes more or less and upwardly to hundreds of amperes; although certain structures embodying the invention are useful also for high potential service whether or not large currents be used. The invention is particularly useful with alternating currents of high amperage and high frequencies such as radio frequencies.

Heretofore in condensers of the foil-stack type, in designing the same for use with currents of more than a few amperes, it has been necessary to increase greatly the number of dielectric sheets, for the sole purpose of preventing serious over-heating of the condenser by such high currents. Inasmuch as good quality dielectric sheets for condenser work, such as good quality of the preferred mica sheets, are very expensive (i. e., many times more expensive than metal), and inasmuch as the amount of mica necessary to prevent over-heating by the high currents increases very rapidly with the amperage employed, the cost in mica for such high current mica-and-foil condensers has been very high heretofore. The reason why the use of a much larger quantity of dielectric sheets resulted in preventing undue heating of the condenser by high currents was the consequent reduction of current per sheet and therefore the reduction of the watt loss per sheet, the total watt loss being distributed throughout the increased number of sheets, thereby providing a larger dissipating surface of the stack, i. e., such surfaces comprising the edges of the mica sheets in the stack. In order to maintain the originally desired capacity of the condenser when thus increasing the number of dielectric sheets, it was usually necessary to divide the stack into several serially-connected sections whereby the voltage per section was reduced and whereby also were reduced the losses due to brushing resulting from high voltage. The greater part of the increase in dielectric sheets to prevent overheating by high currents was due to such series-sectional construction.

The principal and important object of the invention is to reduce the quantity of dielectric, such as mica, in condensers designed for high current duty. Other minor but valuable objects and results will be disclosed in connection with the drawings.

The invention consists, among other things, of a foil-stack condenser construction wherein the heat developed by the high alternating currents used is so efficiently conducted away from the stack as to make is unnecessary to increase the number of dielectric sheets (quantity of mica) for the purpose of causing a lower heat generation per sheet. In a certain sense, the invention involves to a certain extent the substitution of masses of metal constituting heat-absorbing, heat-conducting and heat-dissipating means, in lieu of the addition of much more expensive dielectric sheets.

Of the drawings,

Figs. 7-9 show another embodiment wherein a single clamped unit of the invention includes two condenser sections in a stack, as in Fig. 6, but wherein such two sections are connected in parallel with one another, Fig. 7 being a side elevation partly in section, Fig.

8 a sectional plan of Fig. 7 at line 8—8 thereof, and Fig. 9 an exploded diagram showing the paths of the current through the conducting foils of the two sections connected in parallel.

Figs. 14–17 illustrate another embodiment of the invention, Fig. 14 being a section at 14—14 of the plan of Fig. 16; Fig. 15 an end elevation; Fig. 16 a plan; and Fig. 17 an assembly of a plurality of the invention-units shown in Figs. 14–16.

Figure 1:
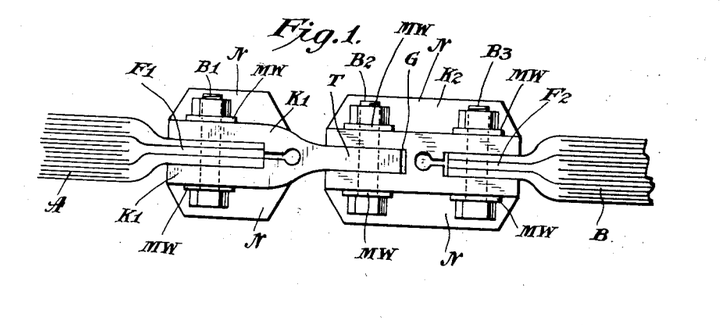
Figure 1 is a diagram showing two condenser stacks connected in series via means shown in plan for extracting the heat developed in the stacks and dissipating it.

In Fig. 1, A and B are sections of short stacks of foil-and-mica sheets, electrically connected in series by the intervening apparatus. The latter is of such construction and is so combined with the foils of sections A and B as to extract therefrom the heat developed in the dielectric sheets thereof by high currents. F1 and F2 are bunches of projecting portions of a number of foils in stacks A and B. Each bunch comprises foils which are distributed through all or the greater portion of the stack, and have their broad flat surfaces in contact with the like surfaces of the dielectric sheets distributed through the stack, so that the foil bunch can conduct away from the interior of the stack the heat generated in the dielectric sheets, provided that there be employed the means to be described whereby the heat can be removed at a desirable rate and at a desirable low temperature of the stack. While in any case the amount of heat which will be radiated will be the same as the amount generated, it is the object of this invention to cause the heat removal to commence before the stack becomes too hot and to continue this heat-removal at the desired low temperature of the stack.

The broad flat sides of the bunch of distributed foils F1 (projecting from the right of stack A) are clamped by metal bolts B1, one in front of and one in back of (not shown) the heat-dissipating fins N. Bolts B1 clamp together around foil bunch F1 the forked portions of a split metal heat-conducting clamping member K1 formed with said fins N. At the right, the broad flat sides of the other foil bunch F2 (projecting from the left of stack B) are clamped by bolts B3 between the forked portions of another split metal heat-conducting clamping member K2 also provided with radiating fins N. Said split metal heat-conducting clamps K1, K2 have a tongue-and-groove construction TG by which they are clamped together by bolts B2. Member K1 not only connects foil bunch F1 electrically to the structure and stack A at the left, but is a mass of metal (such as iron, phosphor bronze or aluminum) and of fairly high melting point having a large external heat-dissipating area and directly connected thermally to the broad flat surfaces of foil bunch F1, so that member K1 acts to conduct heat from the heat-generating dielectric sheets via the distributed foils to the large heat-dissipating area of member K1 itself. From member K1 such heat is dissipated either simply and preferably by being exposed to atmosphere, or if desired or in cases of excessive stack-heat generation, to a substantial body of cooling liquid, or to an air blast or a circulating cooling liquid. Also if the current used be not too high, the entire construction including stack A may be embedded in paraffin wax as in the case of ordinary high potential dielectric and foil sheet condensers, although, in general, the invention is preferably employed without such embedment, and indeed constitutes an improvement permitting elimination of such embedment and consequent reduction in cost. In fact, since cooling by any means other than simple exposure to atmospheric air is expensive, or unreliable, or requires moving parts, that is the preferred cooling method here; and it is the great advantage of the invention that the large dissipating area in good thermal connection with the dielectric sheets in which the heat is generated, provides a means of adequate heat-removal in still air.

At the right of Fig. 1, the substantially massive metal member K2 acts with respect to stack B as does member K1 at the left relative to stack A, as above described.

The tongue-and-groove coupling at TG acts as a mechanical and electrical heat conductor coupling between foil clamping members K1 and K2. Said members K1 and K2 may be provided with radiating fins N or the like to provide the dissipating area desirable in some cases and permit the continuous extraction of heat from stacks A and B directly via the heat-conducting foil bunches F1, F2. Said fins or vanes N also contribute to the strength of members K1, K2 as clamping members.

Figure 22:
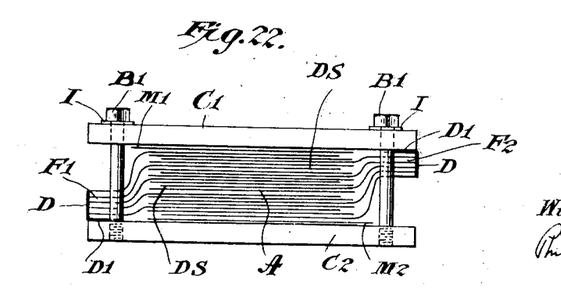
Fig. 22 is a diagram showing foil bunches soldered to stack-clamps.

In Fig. 1, as in all embodiments of the invention wherein the foil bunches projecting from a foil-stack have their faces thermally connected with large-aread heat-dissipators by means of clamping (as distinguished from other equivalent means of establishing the heat-transferring relation), such as by fusing (soldering, sweating, welding or brazing the foil bunches to the heat-absorbing metal masses, Fig. 22), the holes for the clamping bolts through foil bunches F1, F2 need not be made by an operation independent of applying the bolts B, because it is practicable to use the bolt as the means for punching its hole through the entire foil bunch, so that the act of screwing the threaded bolt through the tapped metallic clamping masses on opposite sides of a given usually thin foil bunch will force the hole through the latter for the passage of the bolt. (Observe that only a few foils may comprise the foil-bunch, and the entire stack may be thin as compared with the heat-dissipator.)

In Fig. 1, as in all the side views of the stacks save Figs. 14–17, the sheets composing the stack are shown for clearness as somewhat separated from one another, so that the stacks appear thicker than they are actually when, having the same number of sheets as shown, such sheets are forced together in intimate contact with one another by means of the stack-clamps shown in Figs. 1–4 and other figures. Such expanded views of the stack therefore are diagrammatic to that extent; and actually, for a given number of sheets, the clamping members C1, C2 of Fig. 2 et seq. in practice lie very much closer to one another than is shown; and each clamp usually has an exposed dissipating area which is of the same general order of magnitude as the external area of the stack itself (usually somewhat larger), so that the clamp provides a heat-dissipating surface (thermally connected via the distributed foils with the dielectric sheets distributed through the stack), which is adequate to remove heat continuously at a desirably low temperature of the stack. Also because the stack is usually quite thin (only a fraction of an inch, see Fig. 14) as compared with the stack clamps, and as the clamps extend more or less beyond the edges of the foils, the clamps actually serve as a protective casing substantially enclosing the stack and projecting foil bunches. Hence the arrangement shown partially diagrammatically in Figs. 1, 3, 5–7, 9, 10, 12, 18, 20 and 22, actually appear, when the clamps are tightened up, more or less like the clamped unit shown in Fig. 15, where the clamps constitute a protective casing substantially enclosing the stack. In practice, it is preferred to cover with insulation resistant to moderate heat (as bakelite, rubber, or the like) the sides of the stack (as at A, Fig. 14) which otherwise would be exposed to air and moisture.

Figure 14:
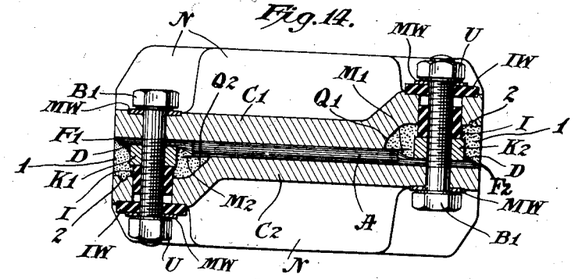
Figure 15:
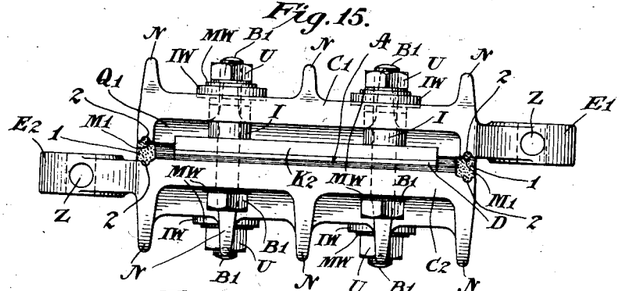
Figure 16:
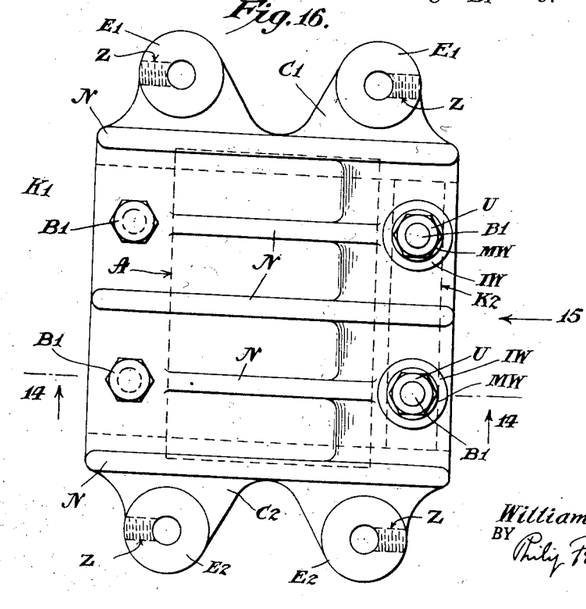

The commercial embodiment (such as shown in Figs. 14–16, for example) illustrates the point that there is an extended surface of heat-dissipating metal exposed to the environment, preferably still atmospheric air (as distinguished from prior stacks where the heat-dissipating exposure was chiefly of the sides of the stack itself consisting of the edges of the dielectric and foil sheets), such extended surface having a thermal connection via the foils to the entire surfaces of dielectric sheets distributed through the stack wherein the heat is generated during service. From the drawings of the commercial embodiments of the invention, it will be seen also that the heat-dissipating area may be a number of times greater than the external area of the stack itself, being, however, of substantially the same general order of magnitude, although preferably a number of times (not many) larger and permissively even smaller. The invention resides in the combination of a stack and heat-dissipating means having an exposed area of the above-stated order of magnitude (within wide limits, for various designs, the criterion being the dissipation of all the generated heat at a desirable low stack-temperature), wherein the heat-dissipating means has good thermal connection with the dielectric sheets distributed through at least a substantial portion of the stack by way of projecting foils similarly distributed.

Figure 2:
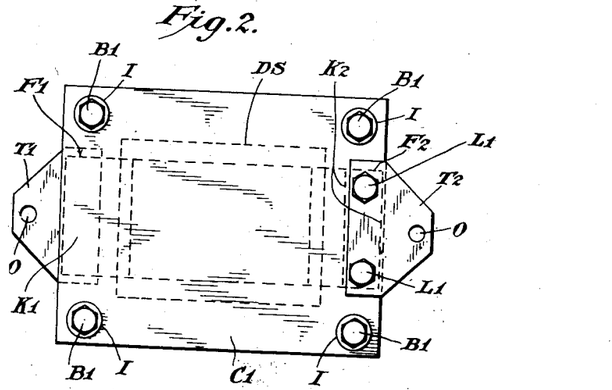
Figs. 2-4 show another embodiment of the invention employing a single stack or stack-section, Fig. 2 being a plan, Fig. 3 a side elevation, and Fig. 4 an end elevation.
Figure 3:
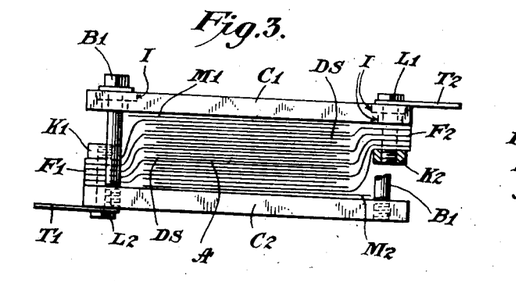
Figure 4:
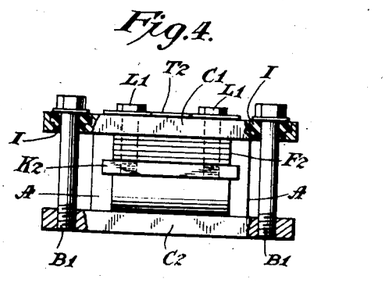

Preferably the sheets of a stack are held together under high pressure as by the clamping members C1, C2 shown in Figs. 2–4, operated as by four compression means or clamping bolts B1 at the four corners of said members or plates. Thereby the faces or active areas of all the adjacent foils and micas alternated with one another in the stack, are held in intimate contact with one another successively, so that the heat immediately upon its generation is conducted away from the micas by the foils to the large-aread heat-dissipator and the extended surface thereof exposed to the atmosphere.

In stack A (Figs. 2–4) some of the stack foils project out to the left, in a bunch shown at F1, beyond the dielectric sheets DS. The other foils project out to the right, at foil bunch F2. Foil bunch F2 (Fig. 4 and at the rights Figs. 2–3) is clamped by two auxiliary compression means or bolts L1 between upper main stack clamp member C1 and an auxiliary metal foil-clamp member K2; so that the two broad flat surfaces of F2 are thermally connected directly to the outer or main stack-clamp member C1, whereby (as in the case of Fig. 1, and foils F2 and clamp K2 thereof) the metal masses of the clamp members C1 and K2 act as heat conductors extracting heat directly from the condenser stack via foil bunch F2. These heat extractors also preferably have a large volume, giving them considerable strength, thereby adapting them to serve well as clamping members for maintaining pressures on the stack as high as desirable, even as great as a thousand pounds or more per square inch of active condenser-sheet area. This construction also constitutes a sturdy encasing arrangement mechanically protecting the stack and its projecting foil bunches from injury from external sources (Fig. 15), but also adapting the stack, foil bunches and main and auxiliary clamps to exposure, if desired, to an external heat-conveying medium such as air, so as to maintain all the clamping members at sufficiently low temperature to draw heat rapidly and continuously from stack A.

In Fig. 3, the broad flat surfaces of the other projecting foil bunch F1, at the left, in a similar manner are clamped by bolts L2 between lower main stack-clamp member C2 and a second auxiliary metal foil-clamp member K1, so that those foils projecting from the stack are thermally connected directly to the metal mass of the outer or main stack-clamp member C2.

The stack-clamps as heat-dissipators also are in thermal contact with the ends of the stack.

Figure 18:
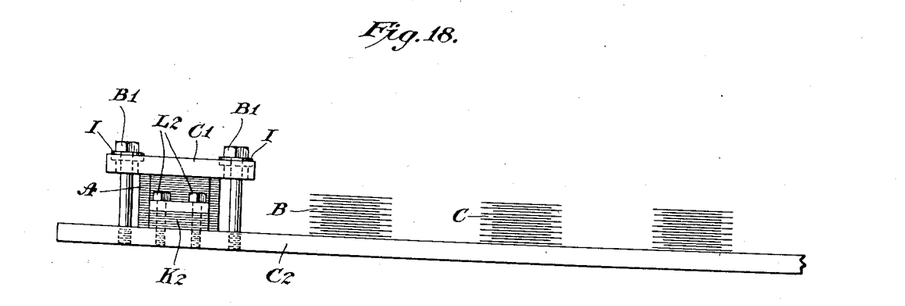
Figs. 18–19 illustrate another embodiment of the invention, Fig. 18 being an elevation, and Fig. 19 being a plan of a portion of Fig. 18.
Figure 19:
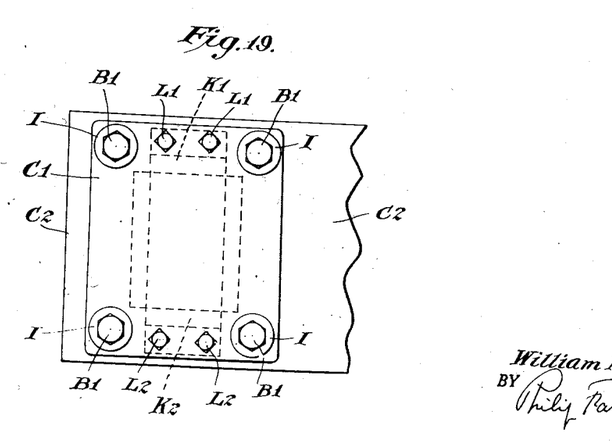

One foil bunch F1, of one polarity, is connected to lower main stack-clamp member C2; and the other foil bunch, F2, of the opposite polarity, is connected to upper main stack-clamp member C1. Clamp members C1, C2 are shown in the embodiment of Figs. 2–4 as being electrically separated from one another by insulating bushings I between bolts B1 and upper main or stack-clamp member C1. Members C1, C2 are provided (Fig. 2) with terminal couplings T1, T2, which are analogous to the tongue-and-groove coupling TG of Fig. 1. Terminals T1, T2 of Fig. 2 are formed with bolt holes O to receive coupling bolts CB of the multi-unit stack-assembly of Fig. 5. Terminals T1, T2 of Fig. 2 are secured to clamps C1, C2 by the same bolts L1, L2 which clamp the projecting foil bunches F1, F2 to clamp members C1, C2. The clamped condenser unit of Figs. 2–4 is designed for use in either series or parallel connection with another like clamped unit, to constitute a multi-unit condenser. Such a series connection is shown in Figs. 18–19.

Figure 5:
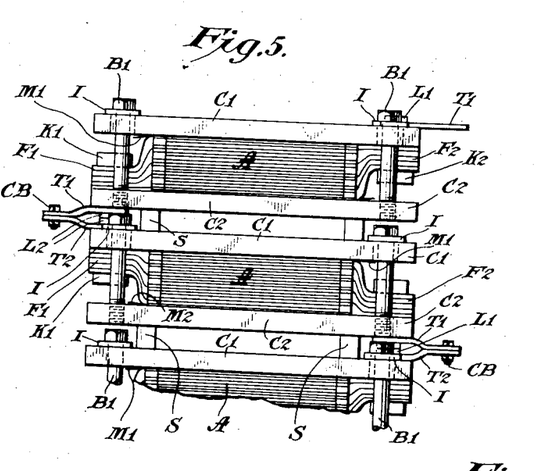
Fig. 5 is a side elevation showing a plurality of units like that of Figs. 2-4, these units being arranged in a stack, and the condenser stacks of the units being electrically connected in series for high potential service.

In Fig. 5 is shown a series-sectional stack comprising a plurality of clamped units like that of Figs. 2–4, and connected in series; that is, a stack wherein three stack sections A are connected in series; but instead of the foil bunch of one section being electrically connected (as by fusing or clamping) directly to the foil bunch of the next section, as has been the practice prior to my invention, the three serially-connected stack sections of Fig. 5 are connected together by way also of the adjacent clamping members of successive sections, one portion of the clamping member having a broad surface of the projecting foil bunch clamped to it, and another portion of the same clamping member having a terminal, as T1, by which connection is made to a similar terminal T2 connected to the clamping member of an adjacent clamped unit. By this arrangement, one bunch of foils distributed through the stack is thermally connected to a clamping member of its clamped unit, the bunch of distributed foils of the next adjacent stack section is thermally connected to a clamping member of its own unit, and the two adjacent clamping members of said two clamped units are connected together in series by way of terminals T1, T2 bolted at CB to said respective clamping members and to one another so as to obtain good thermal clamp connections throughout for high current use. And the separately clamped units (with their stack-distributed foils clamped to the stack-clamps as in Figs. 2–4) are separated (Fig. 5) from one another as arranged in the stack of clamped units, by insulating spacers S, for the purpose of insulating the sides of the clamped sections from one another, and particularly to provide ventilating or cooling spaces between the adjacent clamps of adjacent units.

The units of Figs. 2–4 may be used in plurality in parallel connection, if desired; and either in the stack as in Fig. 5 or end to end as in Fig. 1. And, as in Fig. 1, the clamping members (either of the foil bunches of Fig. 1, or of the stacks or the foil bunches or both, of Figs. 2–4), may be formed or provided with any desired heat-dissipating fins or corrugations. In fact, the latter applies to all embodiments of the invention.

The clamped sections of the stack of Fig. 5 are adapted, as in Figs. 2–4, for economy of mica or other dielectric sheets in high current working of the serially-connected and clamped sections of the stack of Fig. 5, adapting the stack for high potential service, as well known, in addition to such high current service. In this stack of Fig. 5, there is a mica saving of approximately seventy-five per cent. for all high frequency currents of high amperage. That is, in this invention, it is necessary to use only about one-quarter (say, from one-third to one-sixth) as much mica as that needed (in lieu of the invention) to prevent over-heating. The principal mica saving is at the higher alternating current frequencies, say from several thousand per second upwardly. If desired, the invention may be employed without the maximum mica saving which it permits, by using some additional mica to distribute the watt loss, and relying on a sufficient area of my heat-dissipator thermally connected to the stack-distributed foils, for the purpose of dissipating the generated heat at a desirable low stack-temperature.

In such a stack as that of Fig. 5, which comprises separate clamped units of the invention, there is also another very important advantage additional to the above high economy of mica, this advantage involving an improvement over all prior foil-stacks, whether or not mica was added to prevent over-heating by high currents. That is, in prior foil-stacks, if there were an unevenness of mechanical pressure over the active area of the stack between the end clamps thereof (particularly in long stacks used in series-sectional high potential condensers), due to slight displacement from the center of active area of portions of the stack intermediate the end clamps, there was a tendency of a long stack to buckle, thereby causing a change in capacity of the stack due to consequent release of mechanical pressure. Since such prior foil stacks with a paraffin embedment usually were enclosed in metal casings (the paraffin wax acting as a conveyor of heat from the stack to the casing), then when the wax became softened by heat from the stack, there was nothing to prevent the above-mentioned buckling of the stack at a point or points intermediate its length between end clamps. But in stacks such as that of Fig. 5, there is a plurality of clamping members which are distributed throughout the stack, and there is a relatively small number of sheets between each pair of stack-clamps so distributed through the entire stack, so that there is no tendency toward buckling, and the mechanical pressure always is maintained uniform over the entire active area of all the sheets throughout the entire length of this series-sectional stack.

Fig. 5 illustrates the fact that the various individual stack-sections of a series-sectional stack are complete stacks in my invention, in the sense that they are provided with their own heat-dissipators (C1 or C2 or both) of extended surface and in good thermal connection with a plurality of foils distributed through at least the greater portion of the individual stack or section; such individual heat-dissipators being additional to the heat-dissipators of the other individual sections or stacks of a series-sectional stack such as that of Fig. 5. Thus foils distributed through the entire or at least the greater portion of the series-sectional stack as a whole are connected thermally to the micas distributed through the stack, on the one hand, and on the other to the heat-dissipating means of area sufficient to remove the heat from the stack at the desired low temperature thereof. This arrangement not only provides one or more removers and dissipators of internal stack heat for each individual stack section of a series sectional stack, but it does this in a way consistent with the proper circuit connections. As in Fig. 5, the two heat-dissipators for each stack-section are respectively at the high and low potentials of the section itself (being electrically as well as thermally connected to the high potential and low potential projecting foil bunches of such stack-section); and one heat-dissipator of each stack-section is electrically connected to the neighboring heat-dissipator of the adjacent stack-section, so that the successive sections of the sectional stack are connected in series with one another, each heat-dissipator being thermally connected with the foils distributed through its own stack-section. Thus the invention provides a practical construction both electrically and thermally, as distinguished from the prior series-sectional stack construction wherein although the foils of one section (as the bottom or end section) were connected to a metal casing enclosing a large paraffin embodiment for the complete series-sectional stack, yet the foils of the other sections could not, for electrical reasons, be connected to such metal casing; and although such metal casing had ample exposed area to dissipate all the stack-heat generated, yet that heat could not be conducted to it via the paraffin embodiment and the stack itself at a desirably low temperature of the stack; that is, beginning and continuing at a rate preventing the stack from exceeding the desired temperature.

Figure 6:
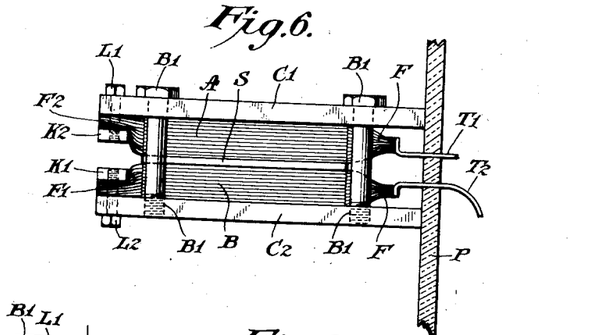
Fig. 6 is a side elevation of a single unit of the invention analogous to the units of Figs. 2-5, but wherein a two-section condenser stack is included in the single clamped unit, these two sections being connected in series with one another.

In Fig. 6 is shown a clamped unit of the invention, wherein is a stack comprising two electrical sections A, B connected in series by the clamping and compressing means, the adjacent faces of these two stack-sections being separated from one another by insulating sheet S. The main body of alternating foils and micas is clamped between metal members C1 and C2 by four corner bolts B1; also projecting foil bunch F1 (Fig. 6) of the stack-distributed foils is clamped to lower member C2 by auxiliary clamp member K1 and two bolts L2; and projecting foil-bunch F2 is clamped to upper member C1 by auxiliary clamp member K2 and two bolts L1. But, the two clamped foil-bunches F1, F2 of Fig. 1 and their auxiliary clamps K and bolts L, are located at the same end (left) of the unit, there are no insulating bushings between upper clamp member C1 and bolts B1, said bolts B1 acting as electrical connections between stack sections A and B (separated from one another by insulating sheet S), and the two terminals T1, T2 of this clamped unit (soldered to the foil-bunches at the right instead of being connected to the clamping members) both extend from the same end thereof, this clamped unit, if desired, being supported on a rack P, or terminal-board or panel. In practice, terminals T1, T2 consist of $\frac{1}{16}$ inch phosphor bronze sheets of the same width as the foils, and lying between stacks A and B and separated from one another by insulating sheet S. This provides a strong construction of the terminal connections. The clamped unit of Fig. 1 may be pluralized in any desired manner in a stack, if desired. All the clamping members of this unit of Fig. 1, however, are at the same potential, which is that of the midpoint between opposite-potential terminals T1, T2.

Figure 7:
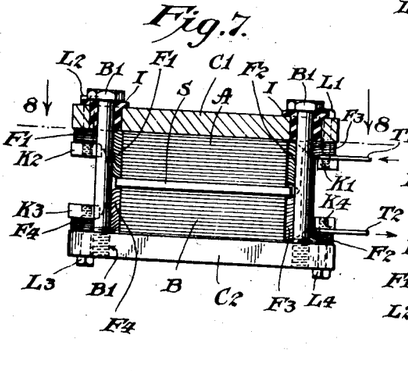
Figure 8:
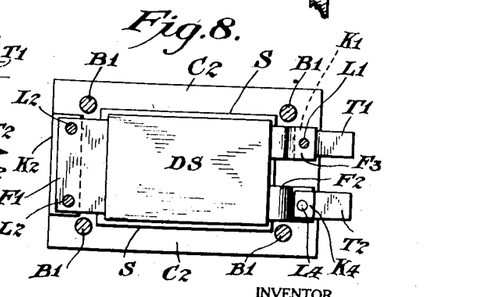
Figure 9:
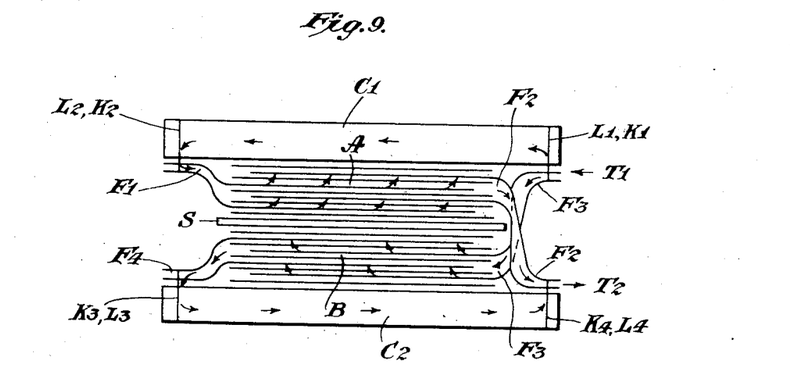

In Figs. 7-9 is shown an embodiment of the invention in a foil and mica sheet condenser stack wherein the benefit of the thermal connection between the broad surfaces of the projecting foil-bunches and metal stack-clamps (or other and non-clamping heat-conducting and heat-dissipating members within the invention) is obtained by way of four projecting foil-bunches in a single clamped unit, as distinguished from the ordinary arrangement in a stack, of two foil-bunches.

In this form of Figs. 7-9, there are two condenser stack sections A and B in the clamped unit, these sections being electrically connected in parallel with one another. Insulating bushings I insulate stack clamps C1 and C2 from one another. The parallel current paths through sections A and B are indicated most clearly in diagrammatic Fig. 9, with its arrows. Current enters terminal T1 and there divides. One part of the current passes through upper stack-clamp C1, to foil-bunch F1 of section A, to section A itself, to its opposite foil-bunch F2, to and out terminal T2. The other current path extends from terminal T1 through foil-bunch F3 of section B, to section B itself, to its opposite foil-bunch F4, to lower stack-clamp C2, to and out terminal T2.

Referring to less diagrammatic Figs. 7-8, right-hand projecting foil-bunch F3 of lower stack section B is clamped to upper stack-clamp C1 and to terminal T1, by means of auxiliary clamp member K1 and its bolts L1. Thus not only is terminal T1 electrically connected to foil-bunch F3, but that foil-bunch is clamped in good thermal connection with upper stack-clamp C1. The right-hand projecting foil-bunch F2 of upper stack section A is clamped to lower stack clamp C2 and terminal T2 by auxiliary clamp member K4 and its bolts and compressing means L4. Thus not only is terminal T2 electrically connected to foil-bunch F2, but that foil-bunch is clamped in good thermal connection with lower stack-clamp C2. The above two clampings are permitted by cutting away part of (reducing) the width of the right hand projecting foil-bunches (see F2, F3, Fig. 8), so that these two foil-bunches may pass over one another without interference.

Also in Figs. 7-8, upper foil-bunch F1 of upper stack section A is clamped to upper stack-clamp C1 by auxiliary foil clamp K2 and its bolts L2. And lower foil-bunch F4 of lower stack-section B is clamped to lower stack clamp C2 by auxiliary foil clamp K3 and its bolts L3.

In the form of Figs. 7-9, the total thermal and electrical path from the distributed dielectric sheets of the clamped stack is doubled (resistance is halved) as compared with that of the embodiments of the other figures, this result being due to the above-described construction shown most clearly in Fig. 1; while the extended external area of the metal heat-dissipators affords ample means for dissipating at a desirable low stack-temperature such doubled amount of heat conducted from the interior of the stack.

Figure 10:
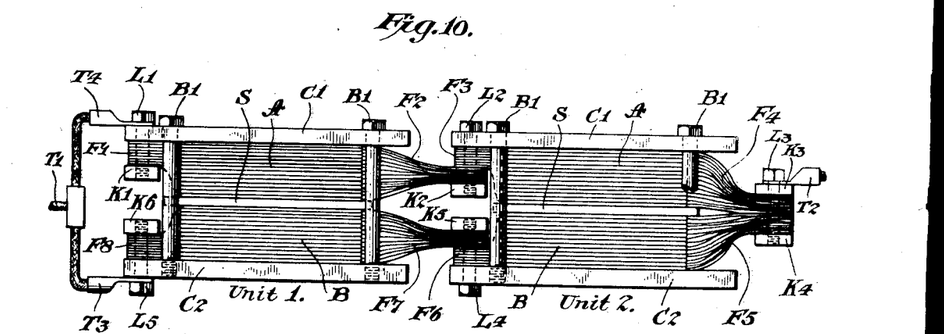
Fig. 10 is a side elevation of an embodiment of the invention analogous to Fig. 1, but wherein the condenser units 1 and 2 at left and right each is embodied in a clamped unit of the invention analogous to Figs. 2–4, each such unit, however, comprising two condenser sections analogous to Figs. 6–9.

In Fig. 10, two unit embodiments of the invention, unit 1 and unit 2, are combined end to end in a condenser in a manner analogous to that of Fig. 1 as distinguished from assembly face to face in a stack. In Fig. 10, each of the two units 1 and 2 is similar (including insulating separator S) to the two-section stack-clamped unit of Fig. 6.

In the assembly (Fig. 10) of such double section stack in the clamping members, there are three features whereby the two sections A, A of the respective units are connected in series with one another, the two sections B, B in series with one another, but sections A, A are connected in parallel with sections B, B. First, at the left, circuit terminal T4 is clamped as shown together with foil-bunch F1 and upper stack-clamp C1; and circuit terminal T3 is clamped as shown together with foil-bunch F8 and lower stack-clamp C2. Second, at the right, foil-bunches F4, F5 are clamped together and to a heat-absorbing mass of metal K4, which may be provided with heat-dissipating vanes, fins or the like, not shown. And, third, where the two clamped units are electrically connected together, they are thermally connected by clamping to stack-clamps C1, C2 of unit 2, by the arrangement shown wherein foil-bunches F2 and F3 are clamped together and to stack-clamp C1, and foil-bunches F6, F7 are clamped together and to stack-clamp C2. By this construction, the foil-bunch terminal of one clamped unit is clamped directly to the foil-bunch terminal of an adjacent clamped unit. In the above-described electrical arrangement of Figs. 2 and 10, T1 and T2 are the circuit terminals; but, all four stack-sections of the two units in Fig. 10 may be connected successively in series by using terminals T3, T4 at the left of unit 1 as the two circuit terminals (not using T1 or T2 or the connections shown between terminals T3 and T4) and inserting insulating bushings between clamp C1 and bolts B1, in both units 2, of Figs. 2 and 10.

Figure 11:
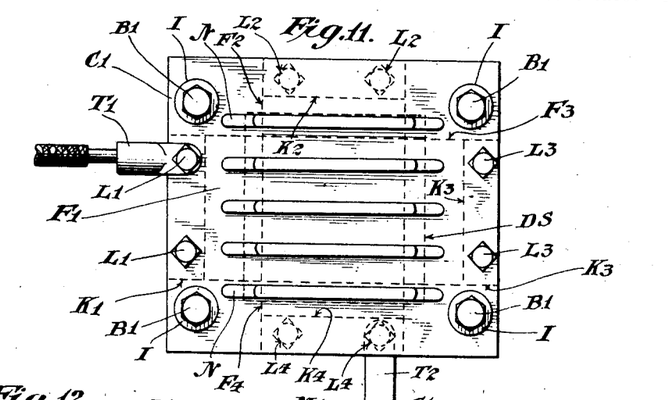
Figs. 11–13 illustrate another embodiment of the invention, Fig. 11 being a plan, Fig. 12 an end elevation, and Fig. 13 an exploded perspective showing the particular arrangement of foils in the condenser stack of this embodiment which is an improvement upon that of Figs. 7–9.
Figure 12:
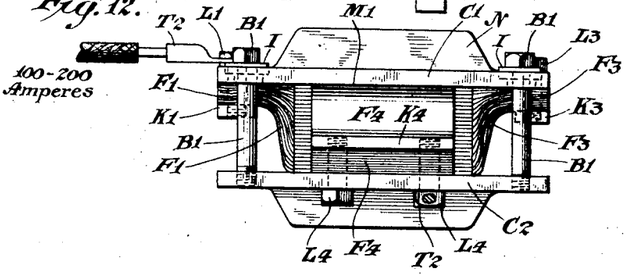
Figure 13:
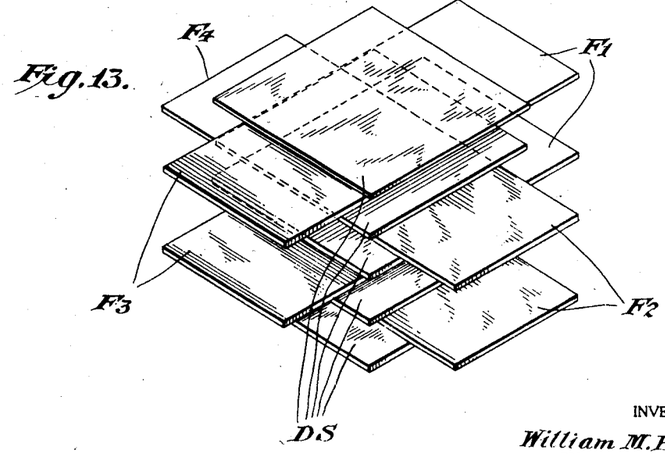

In Figs. 11-13 is shown an embodiment in a clamped condenser unit consisting of sheets of mica and metal foil. The thermal path from the stack is very large and the $I^2R$ loss in this is very small, owing to the very efficient method of application of the invention, as follows.

In Fig. 11 the circuit terminals T1, T2 extend from two adjacent sides (for example, as shown, 90° apart) of the stack, one terminal (T1) being connected to one metal clamping member (C1), Fig. 11, the other terminal (T2) to the other metal clamping member (C2) and members C1, C2 being insulated from one another by bushings I. Also, projecting from the single-section stack held compressed between clamps C1, C2, Fig. 11, are four foil-bunches F1–F4, each of which is clamped between an auxiliary clamp K and a stack-clamp C; foil-bunches F1 and F3 being clamped by auxiliary clamps K1, K3 respectively to upper stack-clamp C1, and foil-bunches F2, F4 being clamped by auxiliary clamps K2, K4 to lower stack-clamp C2. Each of the clamping members C1 and C2 may be provided with radiating fins or vanes N, as shown.

Figs. 3 and 13 show the arrangement of dielectric sheets DS (as micas) and foils F1–F4 in the stack of Figs. 1–2 and 11–12, this being the arrangement which makes possible the effective construction of the foil-bunches shown in Figs. 1–2 and 11–12. As shown in Fig. 13, one set of foils, distributed successively throughout the stack, is laid in the stack at right angles to another set of foils also distributed successively throughout the stack and alternatively with the first set of foils, so that there are four foil-bunches projecting beyond the active area of the stack as measured by the horizontal dimensions of the dielectric sheets DS; although pairs of oppositely projecting foil-bunches are of the same foils and therefore require only one circuit terminal. The foils of bunch F1 which is connected to clamp C1 are the same stack-foils as the bunch F3 connected to the same member C1. Also (and similarly) the foils projecting at F2 in a bunch and connected to clamp C2 are the same stack-foils as those oppositely projecting at F4 and also connected to the same clamp member C2. This connection of opposite ends of the same foils to the same metal clamp member is permitted (without effective short-circuiting of any part of the condenser) by the above-described disposition of the foils shown in Figs. 3 and 13.

The clamping of the respective foil-bunches of Figs. 1–3 and 11–13 directly to the heat-conducting and heat-dissipating metal masses shown, permits use of high frequency currents of as high current as 100 to 200 amperes; for not only is it possible for the heat developed in the stack by such high currents to get out to the projecting foils, but such heat is positively, rapidly and continuously drained therefrom by means of the auxiliary clamping of the four projecting bunches of distributed foils, and thence passes to the extended heat-dissipating surfaces of the stack-clamping means, so that it is possible to quarter the $I^2R$ losses in the stack and keep it so cool as to avoid all liability to injury or destruction thereof. Dissipating fins N (Figs. 1 and 12) may be employed to accommodate the resulting heat-removal at the desired low stack temperature, but they may not be necessary in designs for given service, and the large dissipating area afforded by the clamps themselves, without any fins or the equivalent, may be sufficient in many instances.

The feature of Figs. 11–13, consisting of the four foil-bunches over a given stack or stack-section, may be employed in connection with any other embodiment of the invention.

In Figs. 14–17 is shown an arrangement possessing various features which are applicable to any or all of the embodiments of the preceding figures which are more or less diagrammatic, while Figs. 14–17 involve a showing of engineering design involving the various features of the preceding figures. Figs. 14–17 also show various additional features to be described, which are very important in the practical use of the features of the preceding figures. In Figs. 14–17, two aluminum, bronze, cast iron, or other metal clamping members C1, C2 hold condenser stack or section A between them, to compress the flat surfaces of the sheets of the stack in intimate and good thermal contact with one another. These clamps substantially surround the stack and its projecting bunches of stack-distributed foils and constitute a sturdy enclosing casing therefor. Each half of this casing-clamp has a pair of bosses E1, E1 and E2, E2 respectively, each of which is perforated as shown to receive bolts H (Fig. 17) in the assembly of the unit shown in Figs. 14–16. In the clamped unit of Figs. 14–16, four bolts B1 (Fig. 16) with nuts U hold the members C1, C2 of the clamping cases against the stack A, to obtain the desired intimate contact of the sheets thereof. The same bolts or compressing means B1 also clamp the projecting foil-bunches F1, F2 between the respective stack-clamps C1, C2 and auxiliary brass foil-clamping members or bars K1, K2. (The metal bolts which clamp the foil-bunches may extend, as shown, through holes in the projecting foil-bunches.) Clamps C1, C2 may be cast as shown with integral radiating fins N; and they are insulated from one another by insulating washers IW and insulating bushings I. Metal washers MW are placed between the nuts U and insulating washers IW and between the heads of bolts B1 and metal clamps C1 and C2. The ends of the foil-bunches which project beyond the auxiliary clamping bars K1, K2 preferably are fused at D (soldered, sweated, brazed or welded) to one another, and, if desired, are fused also to said respective bars (Fig. 22), in order to provide the best thermal path between the dielectric sheets in the interior of the stack and stack-clamps C1, C2 to which the foil-bunches are compressed by said bars K1, K2. As shown, the foil clamping bolts (as B1 in Fig. 14) which pass through the stack-clamping members C1, C2 are threaded at their portions which pass through the auxiliary clamps K1, K2 respectively. Thus all portions of the surfaces of the mica sheets and foils in the interior of the stack are connected thermally to the stack clamps by means of the clamping of one broad surface of the projecting foil-bunch to a stack clamp, and also by the fusing together of the foils in the projecting foil-bunch. While the auxiliary stack clamps K1, K2 serve mainly as a means of conducting the heat to the stack clamps, yet said auxiliary clamps serve to a considerable extent as direct dissipating means for the heat received by them from the foil-bunches. The fusing together of the foils in a projecting foil-bunch reduces the electrical resistance as well as the thermal resistance between the several foils. This fusing is particularly advantageous when, as in the practice of the invention, the stack is built up initially in the presence of molten paraffin, a part of which, even after being substantially compressed out of the stack, is liable to remain as a very thin insulating film on the adjacent surfaces of the foils in a foil-bunch, constituting heat-insulation between the flat faces of the foils.

In Fig. 14 are shown mica sheets M1, M2. Sheet M1 is located between the stack A and upper clamp C1. Sheet M2 is located between the stack A and lower clamp C2. Sheet M1 serves to insulate from clamp C1 the right-hand foil-bunch F2, which is electrically and thermally connected to clamp C2. Sheet M2 serves to insulate from clamp C2 the left-hand foil-bunch F1, which is connected to clamp C1. Also, as shown at Q1, Q2 (Fig. 14), clamps C1, C2 may be cut in or lie slightly inwardly from the edges of the stack A, in which case the insulating strips M1, M2 need not project beyond the stack; although that is desirable and is so shown. In any other clamped embodiment of the invention, it is desirable to insert such insulating strips or sheets M in substantially the same way; this being desirable even if the insulating sheet does not extend beyond the edge of the clamp as shown in Fig. 14, as, for example, when there is employed the cut-in clamp construction at Q1, Q2, Fig. 14.

Figure 17:
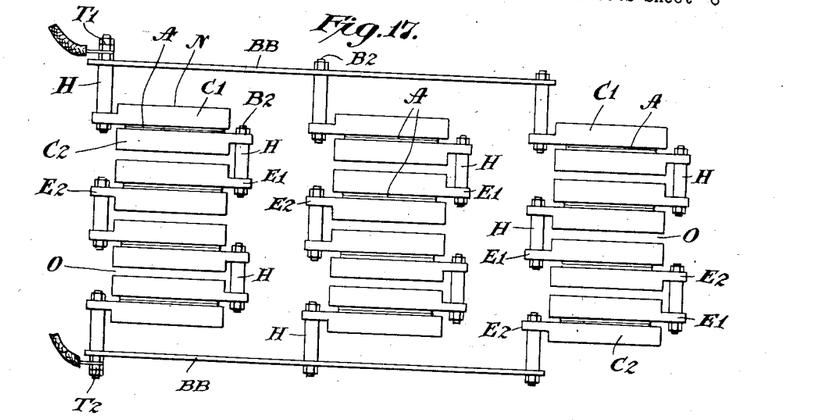

In Fig. 14 is illustrated the fact that the high current condenser of this invention (which also may be embodied in the form of a high potential device when assembled and connected in series as in one of the three stacks of Fig. 17 or in the stack of Fig. 5) consists solely of the stack (or of stack sections as in Figs. 1, 6, 7-9, 18-19, 20-21) and clamping means therefor substantially constituting enclosing casings for the foil-stack structure. That is, there is no wax embedment of the stack in a space between the stack itself and its metal-enclosing casing, as usually in prior commercial forms of foil and mica condensers, especially those adapted for high duty. In such prior wax-embedded metal-encased condensers, it has been customary, either to provide a stack clamp inside the metal enclosing casing, such clamp being embedded with the stack in a paraffin embedment enclosed by the metal casing, or to clamp the stack between opposite walls of the metal casing, the stack being provided with a wax embedment around its sides between the ends engaging the clamping walls of the casing. In either instance, such metal enclosing casings made of extra size to enclose the wax embedments necessarily added considerably to the factory cost. As shown in Fig. 14, there is no wax embedment of the stack between stack and metal casing, and there is no space between the casing and the portions of the stack which are exposed from the clamps, which space wax could be placed advantageously for the purpose of enabling the wax to conduct heat from the stack to the casing, and all parts of the casing act as clamping means on the stack save those parts of the casing extending beyond the sides of the stack which are employed to clamp the foil-bunches to the heat-dissipating members of the casing and to protect the stack and its foil-bunches from mechanical injuries. While the two clamping members substantially enclose the stack and thereby protect it from mechanical injuries and act to remove heat from the stack via the foil-bunches so that no reliance need be placed on a wax embedment to convey heat from stack to casing, yet I place moldable insulating material 1 (Figs. 14-15) (such as bakelite or rubber) over the stack-sides so as to prevent access of air or moisture to the stack. Such insulating material is applied after the completion of the assembly shown in Fig. 15, and is placed in the space between the portions of clamp C1, C2 which project beyond the sides of the stack and so as to completely seal the stack from air or moisture which otherwise would be liable to reach the stack via said space notwithstanding that the stack is substantially completely protected from mechanical injuries by the clamping casing. I may employ any equivalent insulating material such as any of the well-known insulating varnishes or shellacs (baked on the condenser) which will stand a higher temperature than wax without melting. Preferably insulating material 1 when filling the space (as distinguished from a permissible surface coating of varnish or shellac) is held in place in grooves 2 formed in casing-clamps C1, C2. The result of this construction is not only the reduction of labor cost by eliminating the prior wax filling or embedment between stack and metal casing, and eliminating the much reduced expense of metal casing as compared with a stack embedded in a large volume of wax between stack and metal casing, but there is the important operating result that in this condenser a much higher temperature rise is permissible without injury to the stack. For example, in the prior wax-embedded foil stacks, the maximum permissible operating temperature has been only 35° C., because a rise beyond that would cause melting of the wax, possible resulting breakage of the casing by expansion of the wax, and destruction of the stack due to flash-over after exudation of the wax filler and consequent exposure of the stack (for the wax embedment had the function of insulating adjacent portions of the stack to prevent such flash-over). In this invention, on the other hand, as in the embodiment of Figs. 14-16, the unit has been operated without any injury whatsoever at a temperature at least as high as 55° C. Also this condenser has been operated without overheating under current as high as 24 amperes at a frequency of 175,000 cycles per second (1700 meters), the capacity of this condenser being .045 microfarad, and the voltage employed being about 500. These are the operating results due to the metal casing of the present invention which, having an extended exposed heat-dissipating surface, instead of being thermally connected by a body of paraffin to the outside of the stack, is thermally connected via the foils to the interior of the stack, i. e., to the very source of heat generation in the dielectric sheets distributed through the stack.

The stack of this .045 microfarad unit of Figs. 14-16, after being built up in molten paraffin wax, was boiled in wax, then the wax between the sheets of the stack was forced out by compression of the stack so as to remove impurities between the sheets, and finally the sheets were compressed together in intimate contact; no vacuum treatment of the stack having been executed at any time.

The following further illustrates the practical performance of such embodiments as that of Figs. 14-16. Each unit may be designed to handle, without injury by overheating, radio frequency currents, the product of the amperage and potential of which is fifteen thousand more or less. The current may be of the order of 100 amperes in high capacity units (of say one-tenth mfd.); and the potential may be fifteen hundred volts in low capacity units (of say five-thousandths mfd.); these figures being dependent on the frequency employed; and these figures being based on convection by still air from black-painted surfaces of metal heat-extractors provided with radiating projections or fins.

In the assembly of Fig. 17, there are twelve units like that of Figs. 14-16, three stacks being shown of four units each. In each stack, the four units are connected in series. The three stacks are connected in parallel across two busses BB. Of course, otherwise any desired arrangement of the clamped units may be employed, as series alone, parallel alone or series-parallel. Stack-clamping members C1, C2 are cast as left and rights, as to their coupling connections, i. e., the two bosses E1 (Figs. 16, 15 and 17) of clamp-casing member C1 extend from one end of the clamped unit, and the two bosses E2 of clamp-casing member C2 extend from the opposite end of the clamped unit, so that, as shown in the assembly of Fig. 17, the successive coupling connections (bolts H) lie on opposite sides of the stack, thereby separating electrical connections of substantial potential difference from one another; and, the stack being suspended from upper buss BB, establishes heat-dissipating spaces between successive clamped units in the stack mechanically assembled on bolts H. Bolts H as shown are of larger diameter between the clamp members than they are at their two threaded end portions engaged by the nuts shown; so that shoulders on the bolts are formed which engage the bosses of the clamps. As shown in Fig. 15, the bosses are tapped at Z for set screws to engage the threaded ends of bolts H of Fig. 17, to hold the stack structure rigid in vertical alinement against side movements of the clamped units.

As shown in Fig. 17, each condenser section in the stack is provided with its own protecting and clamping casing. When a plurality of such high current clamped units is combined in a series-sectional stack for high potential service, as in Fig. 17, the two circuit terminals T1, T2 are so widely separated from one another that no high potential insulation is needed between them. This is a great advantage in economy over prior commercial forms of series-sectional high potential foil stack condensers wherein the entire stack was clamped by or inside of a single metal casing for all the sections and constituting the low potential terminal of the condenser, thereby requiring an expensive high potential insulating bushing around the high potential lead from the stack which extended out through an opening in the enclosing casing, such insulating bushing surrounding such lead and insulating it from the walls of the opening in the metal enclosing casing for the exit of such lead.

Ordinarily, the foil sheets used in the stacks of this invention are of lead; but they may be of copper foil, which has the advantage of lower electric resistance and greater thermal conductivity, with the additional advantage of ease of fusing, as at D Fig. 14 or at D, D1 in Fig. 22. The clamp members of this invention may be of copper-plated aluminum or of other metal which will permit fusing (particularly when copper foils are used), and in such case the foil-bunches projecting from the stack may have their broad flat surfaces fused to the clamping members (D1, Fig. 22) in lieu of the auxiliary clamps K shown in the drawings. In such case, the auxiliary clamp members K1, K2 of Figs. 14–16 (as means for holding the foil-bunches in heat-transferring relation with stack clamps C1, C2) may be replaced by the fused joint as such means; and when the fused joint is used, it is preferable not to employ the auxiliary clamps, although they might be used also, if desired.

While the clamped units of this invention in any embodiment possess great value in high current service (and in service involving current of high current, high potential and high frequency) on account of the very great saving in mica to prevent over-heating when high currents are used, yet these units are very useful also in high potential service, even at low current values, on account of the elimination, above described, of wax embedment and of a metal enclosing casing for the wax embedment, and the further elimination of an expensive bushing of high potential insulation around the high potential lead passing out of such wax-enclosing metal casing. Hence the series-sectional assemblies of the clamped units of the present invention (wherein the series connections of the clamping members of the several assembled sections adapt the condenser for high potential service) are adapted for high potential service even although the amperage be low. The various examples of the unit disclosed in the various drawings hereof may be assembled in such series-sectional arrangments for high potential service; although when such units as that of Fig. 6 are assembled in such arrangement as in a stack, and held therein as by the bolts H of Fig. 17, such bolts are of insulating material or insulated from the units, and the series connections of the successive units in the stack are by way of terminals T1, T2 as in Fig. 6, fused to the projecting foil-bunches and not thermally connected to the clamping members.

Figs. 18–19 illustrate an embodiment of the invention wherein a plurality of clamped condenser stack units is arranged for parallel connection of the condenser stacks of the successive clamped units, and wherein metal stack clamp C2 serves as a common clamp member and heat-dissipator for all the condenser stacks of the parallel-connected group of stacks A, B, C, etc.; such common clamp member being the functional equivalent of a plurality of heat-dissipators each sufficing for one of said stacks. The complete unit of Figs. 18–19 (including common plate C2 for several stacks) can be pluralized and bolted together in series electrical connection, if desired.

Figure 20:
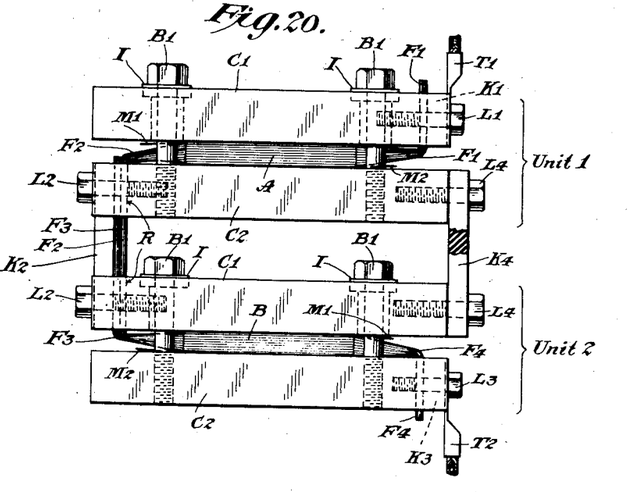
Figs. 20–21 illustrate another embodiment of the invention, Fig. 20 being a side elevation and Fig. 21 being an elevation of a side adjacent to the side shown in Fig. 20.
Figure 21:
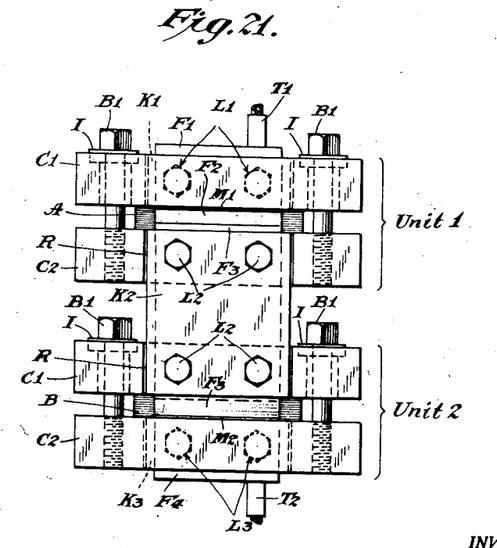

Figs. 20–21 illustrate an embodiment of the invention wherein direct thermal connection of a foil-bunch of one clamped unit to the foil-bunch of another clamped unit, as indicated in Fig. 10, is embodied in a stack of clamped units in which the successive condenser stacks in the successive clamped units are connected in series with one another. Thus, condenser stacks A and B are connected in series by clamping together their respective foil-bunches, as shown at the left. Referring back to Fig. 1, the foil-bunches there projecting from sections A and B are used as the series connections between said sections, but said two foil-bunches are not clamped directly to one another, being clamped to intermediate coupling means constituting heat-conductors and heat-dissipators. In Fig. 10, the heat-conducting and heat-dissipating masses of metal are the clamping members for the foil stacks themselves, and the stacks of one clamped unit are coupled thermally and electrically to the stacks of the other clamped unit by directly clamping together the foil-bunches projecting from the foil stacks. In both Figs. 1 and 10, the plurality of clamped units are assembled in substantially the same plane, as distinguished from the stack arrangements of Figs. 5 and 17. In Figs. 20–21, however, the several clamped units are arranged in a stack as in Figs. 5 and 17, and connected in series, but this series connection is made by direct clamping of the foil-bunches to one another as in Fig. 10. There is omitted from Figs. 20–21 the auxiliary foil-bunch clamps K of the preceding figures; but analogous auxiliary clamps K1–K3 are provided, being applied to the exposed periferies or ends of stack clamps C1, C2 instead of to the stack-faces thereof as in the preceding figures. Foil-bunch F1 of stack A of clamped unit 1 is extended upwardly at the right to lie against the perifery or end of clamp C1 to which said foil-bunch F1 is clamped by auxiliary metal clamp K1 with bolts L1; circuit terminal T1 of the entire condenser being clamped between bolt L1 and clamp K1. At the left middle (Fig. 20), foil-bunch F2 of stack A of clamped unit 1 is extended downwardly in channel R of clamp C2 of unit 1 and down in like channel R of clamp C1 of unit 2. Also foil-bunch F3 of stack B of unit 2 is extended upwardly alongside of foil-bunch F2 in the same channel R. These two foil-bunches F2, F3 thereby may overlap, and are clamped to stack clamp C2 of unit 1 and stack clamp C1 of unit 2 by auxiliary metal clamp K2 with bolts L2, the clamp K2 filling channels R out to the ends of the channeled stack clamps. Thus each foil-bunch not only is clamped to a stack clamp of its own stack, but to the foil-bunch of the stack of the adjacent clamped unit, so that the clamped stacks are not only electrically connected in series with one another, but are thermally connected to one another and to the stack clamps of one another, all whereby the heat extraction from the several stack units is distributed and balanced uniformly throughout the entire series-sectional stack of clamped units. Also the auxiliary clamp K2 (with the clamped foil-bunches F2, F3) constitutes the mechanical coupling between successive clamped units, serving as such coupling in lieu of the mechanical coupling devices of the stack of clamped units which are shown in Figs. 5 and 17, and dispensing with the auxiliary clamps K of those figures which are independent of the devices for coupling the clamped units together. In Fig. 20, at the lower right-hand corner of the stack, a third auxiliary metal clamp K3 and second condenser terminal T2 are provided for the foil-bunch F4, in a manner like those at the upper right-hand corner. Also, insulating member K4 (Fig. 20) may be applied as shown, for the purpose of coupling together (in the stack of clamped units) the ends of stack clamps C2 of unit 1 and C1 of unit 2, opposite to the ends of the same clamps which are coupled together by auxiliary clamp K2 at the left. This insulating coupler K4 resists strains tending to effect accordion action of the stack of clamped units of Fig. 20. In Figs. 20–21, members K2, K4 hold the clamped units in spaced cooling relation.

In Fig. 22 is shown, somewhat diagrammatically, a clamped unit of the invention analogous to that of Fig. 2, in which the ends of the sheets of the foil bunches are fused together at D (soldered, brazed or welded), as above described in connection with Figs. 14–16; and also in Fig. 22, and as heretofore generally described, the heat-transferring relation between the broad surfaces of the foil-bunches and the stack clamps is obtained by fusing such surfaces as at D1 to similar broad surfaces of the stack clamps. This is a means of establishing such heat-transferring relation which is either alternative with or ancillary to the auxiliary clamps K of preceding figures; although preferably alternative.

Aluminum is preferred for the stack clamps (the foil clamps may be of brass) to prevent too great weight of the structure; although phosphor bronze or even cast iron may be employed for the stack clamps. I have found it to be effective to cover the exposed surfaces of the clamps (heat dissipators) with black paint or lacquer, to accelerate the heat-dissipation. Also such covering in some cases permits a smaller degree of exposed dissipating area, and permits still air cooling without forced draft or circulation of cooling liquid.

With the invention may be employed the well-known "floating foil" construction of stack, wherein the "floating" foils are those not connected to the external circuit but are merely located in the stack intermediate the foils which are connected to the circuit. Notwithstanding the presence of the "floating" foils, all the mica sheets in the stack are adjacent to and therefore in good thermal contact with the circuit-foils so that heat is extracted pursuant to the invention. The presence of the "floating" foils in a stack provided with the invention is useful in that they permit a lower capacity of the condenser and they also lower the potential per unit thickness of mica.

Most of the features of each figure of the various drawings may be combined in a single structure with most of the other features of all the various drawings.

In general, condensers embodying this invention are designed for moderate to high capacity of each clamped unit, .005 to .2 microfarad being obtained readily. With such range of capacity, almost any relation of capacity, voltage and current may be obtained by employing a plurality of units in various relations of series, parallel, or series-parallel.

The following has been a practical result of placing the distributed projecting foil-bunches in heat-conducting relation with one or more heat-dissipators of the specified order of exposed area. It has proven to be practicable to construct foil-stack condensers for high current duty with the same quantity of mica as for low current duty, and this whether the stack have only one or a plurality of sections. That is, by positively pulling out from the stack, so to speak, via the foil-bunches and the heat-dissipators, the heat developed in the stack by the use of high currents, there is obviated all need of increasing the quantity of mica for the purpose of ridding the stack of the heat so developed. And while, with the invention some mica may be added to assist in removing heat from the stack, the need of the same is removed in proportion to the efficiency of application of this invention. Prior to the use of said invention, the use of high currents required each section of a series-sectional stack to contain additional sheets of mica (more than was needed to obtain a desired capacity), in order to avoid over-heating by such currents, and in order to maintain a given desired capacity for the condenser it was necessary to divide the stack into serially-connected sections (or to increase the number of sections in a stack already comprising several series sections) when the number of sheets of mica in each original section was increased to prevent over-heating. Hence the quantity of mica for a condenser of given capacity was greatly increased, due to the additional sheets in each section and to the additional sheets due to the addition of sections, so that a condenser for high current duty had very much more mica and a longer stack than a condenser for low current duty but of the same capacity. By this invention, the number of sheets of mica in a condenser of given capacity can be kept substantially the same (for high or low current duty) whether the stack consists of a single section or of a plurality of sections connected in series. But the length of a stack provided with the invention (whether in a single section or a plurality of sections) is not necessarily less than that of a stack adapted by increase of mica to run without excessive heating under high current duty; because when the metal clamps for the condenser stack units are employed as in the invention, as the heat extraction via the projecting foil bunches, the metal of such clamps occupies more or less the same order of stack-length as when extra micas were employed for heat-distribution, being sometimes much greater due to the dissipating vanes. In effect, therefore, the invention involves the substitution of metal for mica, the metal being very much cheaper. Various other advantages of the invention and of its various forms of embodiment have been specified above.

The efficiency of the invention in removing heat from a stack with which currents of very high amperage are employed may be dependent upon the efficiency of dissipation of heat from the metal masses which extract heat from the stack via the bunches of stack-distributed foils. That is, the maintenance of efficiency in continuously maintaining the conduction of heat from the interior of the stack at a desirably low stack-temperature, is dependent upon the continuous maintenance of heat-dissipation from the heat-extracting metal masses.

The following general instructions are given for the guidance of the designor or constructor, relative to this important matter of exposed area of the heat-dissipating means of the invention. This is for condensers of various designs, and condensers for various services as to amperage, frequencies and potential, in which the stack-generated heat may vary within wide limits. This is on the premise that the heat-dissipators are the stack-clamps substantially enclosing the stack and thermally connected via the foils to the dielectric sheets distributed through the stack; and that substantially sole reliance is placed on the exposed surfaces of the clamps for the removal of heat from the stack at the desirable low temperature thereof, it being kept in mind that a higher stack-temperature may be permitted by this invention on account of the permissive and preferred elimination of paraffin embedment of the stack. It should be noted that as the volume of the stack is increased (mica added for any reason), the exposed areas of heat-dissipation should be increased at a more rapid rate than the increase in external stack area corresponding to the increased stack volume. The object of the designer of a given condenser for desired conditions of service is to ensure the removal of all stack-generated heat without permitting the temperature of the stack to rise above a given upper limit. Therefore in designing a given condenser to embody the invention for given service, there will be calculated the amount of heat generated in the stack per unit of time, and the definite rate at which heat must be removed from the stack without "blowing" the stack or exceeding the upper limit of stack temperature. Since the invention provides adequate means of pulling out most rapidly from the interior of the stack, the heat generated therein, provided that after being so removed it is dissipated from the removing means, therefore the designer is concerned only in making sure to provide sufficient exposed area of the heat-dissipator in good thermal connection with the distributed foils. The designer therefore will provide such area sufficient to dissipate the removed heat at the rate at which he has calculated that it will be generated in the stack. And while, in general, such area exposed to the cooling medium will be of substantially the same general order of magnitude as the exterior area of the stack itself, yet it will vary within wide limits in various designs, on account of the several variables specified hereinbefore, including of course the kind of service and the amperage and potential to which the condenser is to be subjected. Within such wide limits there is provided a control by the designer of the stack temperature which it may be desired to maintain. The area of the heat-dissipating means which is exposed to the cooling medium and thermally connected to the specified foils is, in any instance, that which causes dissipation of the heat generated inside the stack at the desired low stack-temperature, depending on the nature of the cooling medium, i. e., whether it is still air, a forced draft or a liquid circulation; and, of course, depending on the conditions of service, as to potential, amperage and frequency; this referring to the area of the heat-dissipating projections or fins or vanes, if and when they are employed as they preferably will be, especially when still air is the cooling medium.

As shown in the drawings the clamping means for the stack is adjustable separately from the clamping means for the foil ends. This enables stack pressure to be adjusted for attainment of precise capacity values, without necessity of changing the compression of the projecting foils. In other words, the electrical values of resistance, etc. for the connections outside the stack are not changed with adjustment in stack pressure. The use of clamping means for the projecting foil ends is preferable to solder for many purposes, because solder frequently is objectionable in splashing and causing short circuits where not desired, and for other reasons.

I particularly point out and distinctly claim the part, improvement, or combination which I claim as my invention or discovery, as follows:—

1. In an electrical condenser consisting of a stack of metal foils and dielectric sheets, wherein portions of the foils distributed substantially throughout the length of the stack project out therefrom, the improvement comprising a two-part metal casing engaging the opposite ends of the stack, said casing-parts being electrically insulated from one another and in direct thermal and electrical connection with sets of projecting portions of said distributed foils; means for drawing together said casing-parts as compression members to compress the stack from end to end; and heat-resistant insulating material covering the sides of the stack not engaged by said casing-parts, and protecting them from access of air or moisture to the interior of the stack.

2. In an electrical condenser of the foil stack type, and having projecting portions of foils distributed substantially througout the length of the stack, the combination of a plurality of such stacks each provided with a pair of metal clamping members engaging the end faces of the stack, said clamping members respectively having direct thermal and electrical connection with opposite potential sets of the projecting distributed stack-foils, the several stacks being themselves arranged in a multiple unit stack and provided with means for separating the successive unit stacks from one another by cooling spaces, the clamping members of each stack unit having extended area exposed to a cooling medium to dissipate at a desired stack temperature the heat generated therein.

3. In a multi-unit stack-assembly of unit condenser stacks of the foil and dielectric sheet type, each stack having projecting portions of foils distributed substantially throughout the stack and each having also clamping means comprising compressing members in direct thermal engagement with said projecting distributed stack foils, the combination with such plurality of individually clamped units, of mechanical means holding said units together in spaced relation to one another in the assembled multi-unit stack.

4. A condenser stack unit for a multi-unit stack-assembly, said unit comprising a stack of alternating metal foils and dielectric sheets, the foils distributed substantially throughout the stack having portions projecting laterally from the stack, and clamping means comprising two-part metal compression means engaging the opposite ends of the unit stack in direct thermal engagement with said projecting portions of the distributed foils; one compression member being provided at one lateral portion of the unit with a construction providing mechanical and electrical connection for a second clamped unit on one end of the given stack unit; and the other compression member being provided at another lateral portion of the stack unit with a construction providing mechanical and electrical connection with a third clamped stack unit on the other end of the given stack unit.

5. An electric condenser comprising spaced rigid metal plates, a stack of dielectric and armature members between said plates, clamping means for the stack, laterally extending flexible armature members of one polarity clamped to one end plate, laterally extending flexible armature members to another polarity clamped to the opposite end plate, and clamping means for the projecting flexible armature members, said last mentioned clamping means and the stack clamping means being separately adjustable.

WILLIAM M. BAILEY.